United States Patent
Mahajan et al.

(10) Patent No.: US 11,254,156 B2
(45) Date of Patent: Feb. 22, 2022

(54) MAGNETIC FIELD PATTERNING OF NICKEL NANOFIBERS USING PRECURSOR INK

(71) Applicants: Chaitanya G. Mahajan, Rochester, NY (US); Denis Cormier, Pittsford, NY (US); Mark Irving, Rochester, NY (US); Scott Williams, Livonia, NY (US); David Borkholder, Canandaigua, NY (US); Ahmed Alfadhel, Rochester, NY (US)

(72) Inventors: Chaitanya G. Mahajan, Rochester, NY (US); Denis Cormier, Pittsford, NY (US); Mark Irving, Rochester, NY (US); Scott Williams, Livonia, NY (US); David Borkholder, Canandaigua, NY (US); Ahmed Alfadhel, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 14 days.

(21) Appl. No.: 16/388,459

(22) Filed: Apr. 18, 2019

(65) Prior Publication Data

US 2019/0322111 A1    Oct. 24, 2019

Related U.S. Application Data

(60) Provisional application No. 62/659,269, filed on Apr. 18, 2018.

(51) Int. Cl.
*B41M 1/22* (2006.01)
*C09D 11/02* (2014.01)
(Continued)

(52) U.S. Cl.
CPC .............. *B41M 1/22* (2013.01); *B41J 2/035* (2013.01); *B41M 7/0081* (2013.01); *C09D 11/02* (2013.01); *B82Y 30/00* (2013.01)

(58) Field of Classification Search
None
See application file for complete search history.

(56) References Cited

U.S. PATENT DOCUMENTS 4,113,658 A    9/1978 Geus
6,110,399 A    8/2000 McArdle et al.
(Continued)

FOREIGN PATENT DOCUMENTS

WO    2016020835    2/2016

OTHER PUBLICATIONS

Mahajan et al., "Magnetic Field Patterning of Nickel Nanowire Film Realized by Printed Precursor Inks" Materials 2019, 12, 928. (Year: 2019).*

(Continued)

*Primary Examiner* — Joshua D Zimmerman
(74) *Attorney, Agent, or Firm* — Bond Schoeneck & King, PLLC; Joseph M. Noto

(57) ABSTRACT

An approach to printing a nickel precursor ink on a wide range of substrates for electronics and magnetic applications is disclosed. The nickel ink reduces to elemental nickel following heating. The ink was printed using an ultrasonic aerosol printing technique. By sintering the nickel precursor ink in the presence of a homogeneous magnetic field, the reduced nickel complex formed continuously aligned nickel nanofibers axially aligned with the direction of the magnetic field. The fabrication of aligned interlayered nanofiber films provides opportunities to produce structures with enhanced isotropic electrical and magnetic properties. The resistivity of the film was found to be as low as 0.56 mΩ·cm, and the (Continued)

saturation magnetization was measured to be 30 emu/g, which is comparable to bulk Ni. Magnetic anisotropy was induced with an easy axis along the direction of the applied magnetic field with soft magnetic properties.

24 Claims, 6 Drawing Sheets

(51) Int. Cl.
    *B41M 7/00*           (2006.01)
    *B82Y 30/00*          (2011.01)
    *B41J 2/035*          (2006.01)

(56) References Cited

U.S. PATENT DOCUMENTS

| | | |
|---|---|---|
| 6,951,666 B2 | 10/2005 | Kodas et al. |
| 7,517,578 B2 | 4/2009 | Raksha et al. |
| 7,875,187 B2 | 1/2011 | Snezhko et al. |
| 8,642,931 B2 | 2/2014 | Stearns et al. |
| 9,818,515 B2 | 11/2017 | Yan et al. |
| 2014/0197159 A1 | 7/2014 | Panico et al. |
| 2018/0264731 A1 | 9/2018 | Kritchman et al. |

OTHER PUBLICATIONS

Sun et al. "Magnetic anisotropy in prismatic nickel nanowires" Applied Physics Letters/ Dec. 24, 2001 79, pp. 4429-4431.
Zhang et al. "Synthesis and magnetic properties of nickel nanocrystals" Materials Research Bulletin/ Oct. 7, 2005 pp. 495-501.
Li et al "Conductive copper and nickel lines via reactive inkjet printing" Journal of Materials Chemistry pp. 1-6.
Sun et al "Formation of one dimensional nickel wires by chemical reduction of nickel ions under magnetic fields" Chem. Commun. (The Royal Society of Chemistry)/ Apr. 11, 2007 pp. 2844-2846.
Zhang et al "Shape controlled synthesis of nickel wires using an external magnetic field" Chinese Journal of Catalysis/ May 2009 pp. 447-452.

* cited by examiner

MAGNETIC FIELD PATTERNING OF NICKEL NANOFIBERS USING PRECURSOR INK

CROSS REFERENCE

This application claims the benefit of the filing date of U.S. Provisional Patent Application Ser. No. 62/659,269, filed Apr. 18, 2018, which is hereby incorporated by reference in its entirety.

This invention was made with government support under grant number 005134-003 awarded by NYS Empire State Development and 1R01DC014568-1 awarded by NIH. The government has certain rights in the invention.

FIELD

The present invention relates to magnetic field patterning of electrically anisotropic nickel nanofibers using precursor ink and methods thereof.

BACKGROUND

Formulation of Ni MOD (metal organic decomposition) precursor inks is challenging because nickel can be easily oxidized upon contact with air. The traditional method of reducing nickel or other element using MOD technique produces nanoparticles without any alignment. Other nickel MOD ink published in the literature show no such alignment.

In functional printing applications, metallic inks may be used to produce features intended to conduct electricity (e.g., printed electronics) or heat (e.g., printed heaters). In recent years, researchers have begun to use different digital printing techniques such as aerosol jet, inkjet, and micro-extrusion to print functional devices such as antennas, electrical circuit components, and sensors using copper and silver metal inks. For printing of magnetic devices, transition metals such as Fe, Co and Ni are widely used owing to their ferromagnetic properties. Among these, nickel is mainly used due to its corrosion resistance, good electrical conductivity, high magnetic permeability, and relatively high saturation magnetization. The printable materials are typically formulated as inks or pastes which require specific rheology or flow properties tuned for the selected printing process. These metal inks are commonly classified as either nanoparticle inks or metal organic decomposition (MOD) precursor inks. Nanoparticle metal inks of copper, nickel and silver have been used in printed electronics. The stability of nanoparticle inks is affected by factors such as agglomeration of the particles and evaporation of the carrier solvent. Nanoparticle inks are prone to agglomeration over time, which can adversely affect print quality due to clogging and uneven material deposition. Evaporation of carrier solvent during printing with some aerosol based printing processes leads to an increase in the ink's solid loading content, thus altering the ink's rheological properties. MOD inks have received considerable interest in the research community due to their potential for overcoming some of the challenges with nanoparticle inks. MOD precursor inks are formulated by dissolving an organic metal salt in an appropriate solvent to produce a homogeneous solution. However, the solid loading with the MOD precursor inks is typically lower than that of nanoparticle metal inks. MOD precursor inks of different metals such as copper, gold, and silver have been formulated and used in printed electronic applications. The formulation of nickel MOD precursor ink is challenging because nickel easily oxidizes upon contact with air.

Nickel nanoparticles and nanowires have been formulated with different techniques such as hydrothermal processing, chemical reduction and electrochemical deposition. Nanowires of nickel have many applications including magnetic data storage and magnetic sensors because of the strong shape anisotropy generated from the high aspect ratio of nanowires. However, the methods to fabricate and print the nanowires onto desired substrates require several complicated steps. Therefore, it is of great significance to develop a practical approach to fabricating nanowires having the desired orientation directly onto the preferred substrate.

Various printing techniques have been developed to pattern metal inks onto the desired substrate. Typical examples include flexography, gravure, screen-printing, inkjet and aerosol jet printing. Among these processes, inkjet and aerosol jet printing are capable of on-demand digital material printing. They are able to print using very small quantities of ink, and they are non-contact printing processes. In an aerosol jet system, the ink is either pneumatically or ultrasonically atomized into a mist that is focused in a nozzle and directed towards the substrate. Larger standoff distances are possible with aerosol jet than with inkjet printing. This feature enables printing of the ink on planar as well as non-planar substrates. Aerosol jet printing has been used to fabricate different functional devices such as transistors, sensors, and strain gauges.

SUMMARY

In accordance with one aspect of the present disclosure, there is provided a method to produce aligned nickel nanowires having unique and customizable structures on a variety of substrates for electronic and magnetic applications. Metallic structures are produced directly onto the substrate by reduction of a precursor ink in the presence of a magnetic field. The ink is a homogeneous solution which can be printed in ambient conditions using direct write printing techniques. The reduction of the precursor is simple and produces pure, template free, aligned nanowires without any further purification. The film morphology can be easily manipulated during the reduction process to produce different structures having unique electrical, magnetic and optical properties.

In accordance with one aspect of the present disclosure, there is provided a method for producing printed, cured, and magnetically aligned geometric patterned metallic nanowires having preferential orientations.

In accordance with another aspect of the present disclosure, there is provided a method for sequentially printing, curing, and magnetically aligning two or more printed geometric patterns in which metallic nanowires associated with each printed pattern have similar or dissimilar orientations.

In accordance with another aspect of the present disclosure, there is provided a method including printing a ferromagnetic precursor ink on a substrate; and curing or sintering the printed ink in the presence of an externally applied magnetic field, so as to reduce the printed ink into nanofibers aligned with the direction of the applied magnetic field lines.

These and other aspects of the present disclosure will become apparent upon a review of the following detailed description and the claims appended thereto.

DETAILED DESCRIPTION

Figure 1:
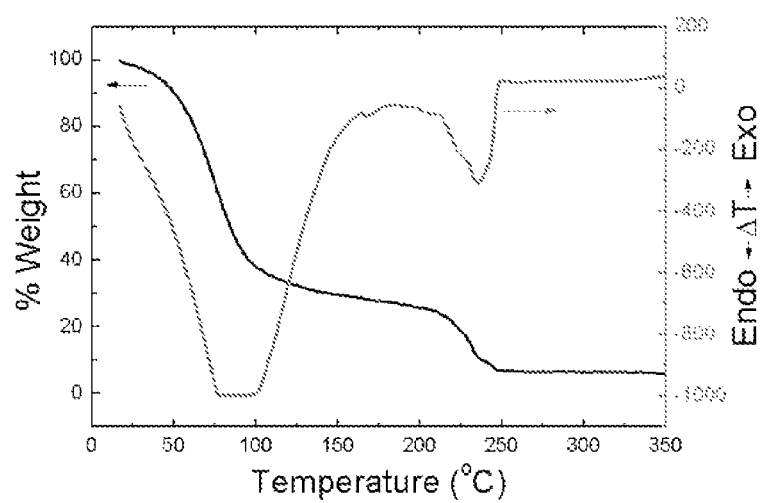
FIG. 1 is a thermogravimetric analysis (TGA) and differential thermal analysis (DTA) of a Ni MOD ink.

The present disclosure includes a method to print nickel or other ferromagnetic metal precursor ink directly on a wide range of substrates for electronics, magnetic and optical applications. By sintering the nickel or other ferromagnetic metal precursor ink in the presence of a homogeneous magnetic field, the precursor ink reduces into continuously aligned nanofibers in the direction of the magnetic field directly on the substrate. The aligned fibers provide anisotropic electrical, magnetic and optical properties in a direction of fiber alignment. A MOD precursor ink is presented in which the nickel complex ink is reduced to elemental nickel. The ink can be printed using the aerosol jet technique or other printing processes (e.g., inkjet, microextrusion, and electrohydrodynamic printing) on different substrates. The reduction of nickel is observed with and without the presence of a magnetic field. The electrical and magnetic properties are enhanced in the direction of the aligned nickel particles. The reduction reaction is simple and byproducts are volatile, leaving quantitatively pure nickel nanowires without the need for further purification. This reduction in the presence of a magnetic field produces pure, template free, aligned nanowires over large areas with weak magnetic fields.

Fabricating aligned interlayered nanofibers in the printed film provides enhanced isotropic electrical properties. Printed electronic applications include conductors, resistors, and thermistors. The alignment can be used in magnetic data storage. The alignment of the reduced nickel has different properties in comparison with the prior published technology. The alignment enhances the electrical and magnetic properties in the direction of the reduced nickel. The number of publications in reducing nickel ink is limited. The alignment of the reduced nickel shows anisotropic electrical properties which can be explored in fabricating different types of sensors and other printed electronic devices. The alignment of the nickel may improve mechanical properties. Ink can be used as an electrode in printed electronic applications where copper or silver cannot be used. For example, some applications may require a metal which could resist corrosion at high temperatures. Other applications may require a magnetic material with highly anisotropic properties. Since the film morphology can be easily manipulated during the reduction process, a number of different novel structures having unique electronic, magnetic and optical properties can be produced.

In accordance with the methods herein, a plurality of layers of ferromagnetic precursor inks are printed and cured in the presence of an externally applied magnetic field, where the orientation of the magnetic field is varied from one layer to the next such that the orientation of nanofibers varies between layers. In accordance with the methods herein, a sequence of geometric patterns of ferromagnetic precursor inks are printed and cured in the presence of an externally applied magnetic field, where the orientation of the magnetic field is varied for each printed geometric pattern such that the orientation of nanofibers is varied from one geometric pattern to another, wherein optionally the patterns fully or partially overlap with one another. In accordance with the methods herein, the printing process includes inkjet, aerosol printing, microextrusion, direct-write printing, flexography, gravure, screen printing, or other types of ink and paste printing known to those having skill in the art. In accordance with the methods herein, the substrate is flexible, rigid, metallic, nonmetallic, planar, non-planar or combinations thereof. In accordance with the methods herein, the sintering or curing may be achieved using thermal processing tools such as vacuum furnaces, hot plates, near infrared lamps, laser sintering, pulsed photonic sintering, or other type of curing or sintering known to those having skill in the art. In accordance with the methods herein, the nanofibers can have different aspect ratios and/or different orientations based on the applied magnetic field and be densely or loosely packed. In accordance with the methods herein, the substrate film includes different thickness. In accordance with the methods herein, the ink includes metallic, nanoalloy or nonmetallic nanoparticles with or without ferromagnetic precursor ink.

The technology is further illustrated with reference to the following specific examples. It is understood that these examples are given by way of illustration and are not meant to limit the disclosure or the claims to follow.

Example 1

Materials: All the chemicals used were analytical grade. Nickel formate (molecular weight (MW): 148.74) was purchased from Alfa Aesar, US, and ethylene diamine was purchased from Fisher Scientific, US. These chemicals were used without any further purification steps. Glass microscope slides (Thermo Scientific, USA) and Kapton® film (DuPont USA, polyimide, 1 mil thick) were used as substrates.

Ink Formulation (Ni-MOD): Ethylenediamine (0.72 ml, 10.77 mmol) was dissolved in 4 mL of distilled water. Nickel formate (0.8 g, 5.38 mmol) was then added to this solvent mixture and stirred at room temperature for 15 minutes. The ink was filtered through a 0.2 μm syringe filter. Other additives such as 1% w/w of Polyvinylpyrrolidone (MW: 3500, K 12) and 20 μL of BYK 333 surfactant (10% v/v solution in distilled water) were added to the filtered mixture.

Characterization: Surface tension of Ni-MOD ink was measured using a contact angle goniometer and tensiometer (Model 250, Rame-Hart, USA) using the pendant drop method. The viscosity of the ink was measured using a microVISC viscometer (RheoSense, USA). The surface tension and viscosity of the ink were 44.01 mN/m and 3.2 cP respectively. To improve the wettability of the ink, the substrates were treated with atmospheric plasma (Surfx Atomflo, USA). Thermogravimetric analysis (TGA) and differential thermal analysis (DTA) (Shimadzu DTG-60, Japan) were performed by heating the sample from room temperature to 400° C. at 10° C./min. Surface morphology and elemental analysis of the printed films were studied using a scanning electron microscope with energy-dispersive x-ray spectroscopy (EDS) (Jeol, JSM-IT100, USA). The thickness of the printed films was measured using an optical profilometer (Nanovea ST400, USA). Electrical conductivity was measured using a four-point probe (Jandel RM3000, UK). Magnetic properties were studied by obtaining the hysteresis loops using a Princeton Applied Research (PAR 155) vibrating sample magnetometer (VSM) modified with Lakeshore Cryotronics 7300 electronics.

Aerosol Jet Printing: To dispense the Ni MOD ink on glass slides and Kapton® films, a Nanojet aerosol printer (Integrated Dispensing Solutions, Inc.) was used. The Nanojet printer uses ultrasonic vibrations to atomize the functional ink. A carrier gas delivers the aerosolized ink to a series of aerodynamic focusing lenses that concentrate the aerosolized ink as it exits the nozzle. The ultrasonic atomizer consists of a planar piezoelectric transducer in contact with the ink having frequencies in the range of 1 to 2 MHz. The atomizer produces a polydisperse distribution of droplets with a size distribution in the range of ~0.5 to 5 µm in diameter. Air was used as a carrier gas to transport the atomized ink to the focusing lenses. Ink passes through the focusing lens and into a tapered Luer lock dispensing tip. A sheath gas flow was used to avoid clogging of the nozzle and to focus the distribution of aerosol droplets onto the substrate. The printer uses Aerotech PRO 165 mechanical-bearing linear stages to move the work table in the X and Y directions and an Aerotech PRO 115 mechanical-bearing linear stage to move the deposition head in the Z-axis direction.

The nickel precursor ink was printed using Optomec aerosol jet printing technique. A solid square pattern (1 cm×1 cm) was printed with a step over distance of 100 µm. The cured nickel films were characterized by SEM imaging to study morphology and the structure of the reduced nickel. The samples were sintered after each printed layer. For printing second and third layer, the Ni MOD ink was printed on the previously sintered layer. The samples sintered without an externally applied magnetic field show reduction of a porous nickel film with particles ranging from 100 to 500 nm. Significant nickel particle necking was observed. The samples sintered in a homogeneous magnetic field show reduction nickel in the direction of the magnetic field. In the process of reduction, the nickel particles were attracted to each other in the presence of magnetic field lines. In order to study the isotropic properties of the printed nickel, an extra case was prepared where the aligned nickel was reduced perpendicular to the first layer.

Alignment Characterization: In order to quantitatively evaluate the orientation of reduced nickel nanowires, a method used by Ayres et al. to measure the fiber alignment in electrospun materials was adopted. It uses a two dimensional (2D) Fast Fourier Transform (FFT) to measure the degree of alignment. Each image was cropped to an integer power of 2-pixel dimensions (512×512, 1024×1024 pixels) and saved as a grayscale image. ImageJ software supported by an oval profile plug-in was used to conduct the 2D-FFT analysis. The 2D-FFT function converts the spatial information into a mathematically defined frequency domain. This frequency domain plots the rate at which pixel intensities change in the spatial domain and produces a frequency plot composed of grayscale pixels distributed in a pattern. The oval profile plug-in was then used to get the summed pixel intensities for each radius of the circular projection on the FFT frequency plot. The values of summed pixel intensities for each radius were used to generate the 2D FFT fiber alignment plot. The peak shape and height determine the degree of alignment, while the peak position indicates the axis of orientation of the fibers.

Ni MOD Ink Characterization: The Ni MOD ink contains nickel formate complexed with ethylenediamine, which undergoes a two-step reduction process to generate a nickel metallic pattern on the desired substrate following printing. The use of formate counter ions decreases the organic content of the complex and therefore decreases the undesired residue during decomposition. Furthermore, the decomposition of nickel formate is accompanied by the release of carbon oxides and molecular hydrogen, which contribute to the reducing atmosphere thus preventing the oxidation of nickel. The bidentate ethylenediamine has been used in the formation of the metal complex to enhance the reduction efficiency.

Figure 2:
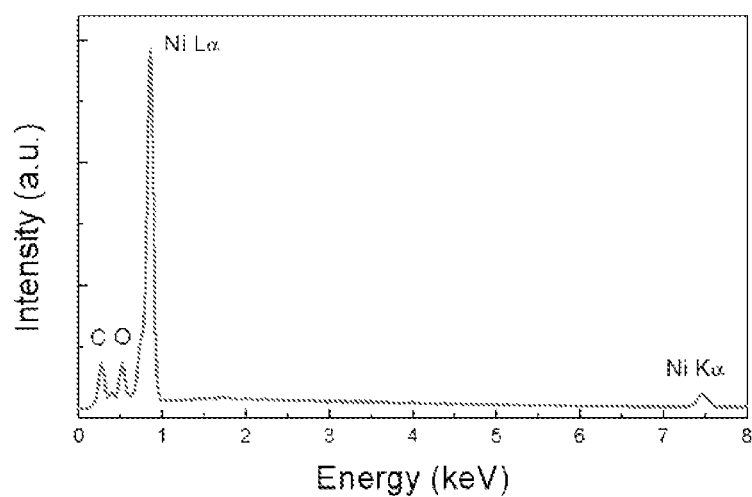
FIG. 2 is an EDS spectrum of a printed and sintered Ni MOD ink.

The Ni MOD TGA shows that the thermal decomposition occurs at two stages (FIG. 1, solid black line). The first stage includes the solvent evaporation up to 100° C., and the second stage involves the reduction of nickel to its elemental state at 235° C. The final amount of nickel in the ink was 5.7% w/w. According to DTA data (FIG. 1, solid red line), the first endothermic peak was observed at 80° C. with corresponding mass loss indicating the solvent evaporation while the last endothermic peak was observed at 235° C., indicating the reduction of nickel at 235° C. The EDS spectrum of reduced Ni MOD ink (FIG. 2) shows peaks for the nickel at 0.851 and 7.471 keV. A small amount of carbon and oxygen was also detected in the EDS spectrum, which was the byproduct of organic decomposition.

Printing and Sintering of Ni Samples: To measure the electrical and magnetic performance of the ink, the Nanojet aerosol printer was used to dispense the Ni MOD ink onto the substrate. Kapton® films and glass slides were used as substrates and were cleaned with isopropyl alcohol before printing. To improve the wettability of the ink, the substrates were treated with atmospheric plasma. The sheath gas and aerosol flow rate were kept constant throughout the experiments to maintain consistency in the printed samples. A solid 1 cm×1 cm square pattern was printed using a gauge 25 dispensing tip. The square outline was filled with a serpentine pattern using a step over distance of 100 µm. The distance between the substrate and nozzle tip was kept constant at 5 mm, and a translational speed of 2 mm/sec was used to print the samples. The printed pattern had a wet film thickness of 4 µm for a single printed layer. The final printed samples were cured at 240° C. for 15 minutes. Two different cases were explored to study the sintering behavior. In Case 1, the samples were sintered at 240° C. for 15 min in the absence of any magnetic field. In Case 2, the samples were sintered at 240° C. for 15 min in a homogeneous magnetic field of 250 Oe.

Figure 3:
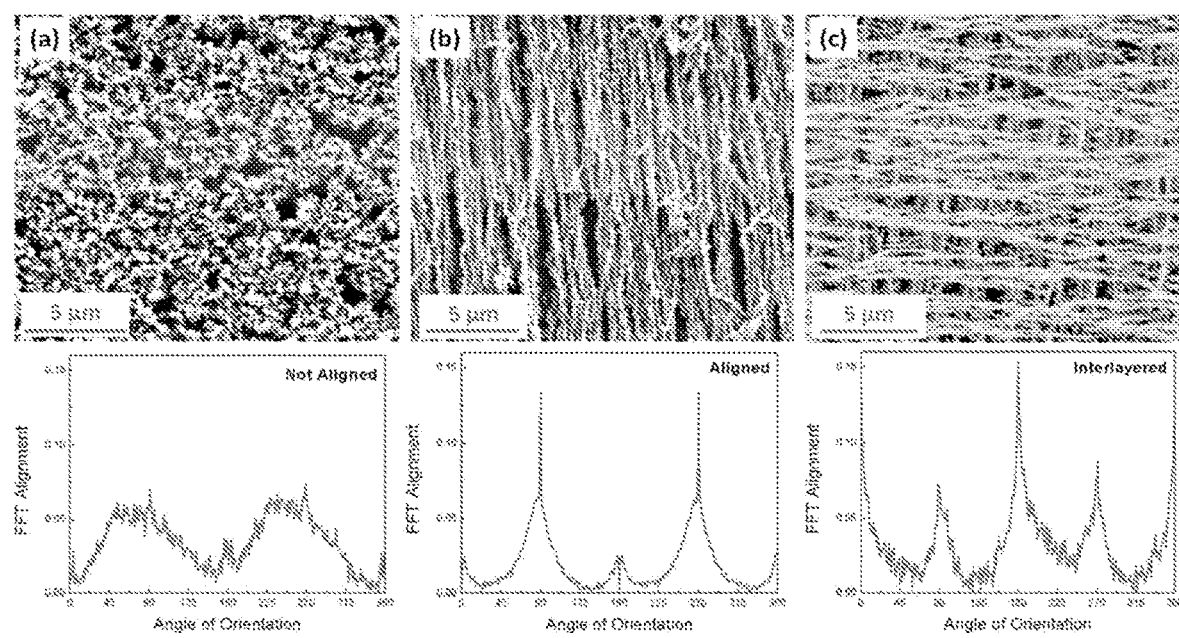
FIG. 3A is an SEM image with corresponding 2D FFT alignment plots of two-nickel layers sintered without the application of magnetic field.
FIG. 3B is an SEM image with corresponding 2D FFT alignment plots of two-nickel layers sintered in a homogeneous magnetic field of 250 Oe in the same direction for all layers.
FIG. 3C is an SEM image with corresponding 2D FFT alignment plots of two-nickel layers with multilayer printing and heating in presence of homogeneous magnetic field with alternating 0° and 90° orientations between layers.

After aerosol printing, each substrate with printed solid square pattern was heated on a benchtop hot plate. The cured nickel films were characterized by SEM imaging (FIG. 3) to study morphology and the structure of the reduced nickel. The samples were heated after each printed layer. For printing of the second and third layers, the Ni MOD ink was printed on top of the previously heated layer. The samples that were thermally processes in a non-magnetic field show reduction of a porous nickel film with particles ranging from 100 to 500 nm (FIG. 3A). Significant necking between nickel particles was observed. In contrast, the samples sintered in a homogeneous and directional magnetic field show a fiber-like structure in which the fiber axes are aligned with the direction of the magnetic field. The nickel particles follow the pattern of the magnetic field lines. In order to study the isotropic properties of the printed nickel, an extra case was investigated where multilayers were printed, and the nickel was reduced in the presence of a magnetic field perpendicular to the previous layer (FIG. 3C).

The FFT alignment plot for nickel reduced in the presence of magnetic field show a fibrous structure with peaks at 90 and 270 degrees, while the nickel reduced in absence of magnetic field shows random particulate structure. The interlayer sample produced using alternating magnetic field orientations shows peaks at 0, 90, 180, 270 and 360 degrees. The intensities of the peaks at 0, 180 and 360 degrees were higher than that of 90 and 270 degrees because the alignment of the top layer was more prominent in the SEM image than that of the bottom layer.

Electrical Characterization

Figure 4:
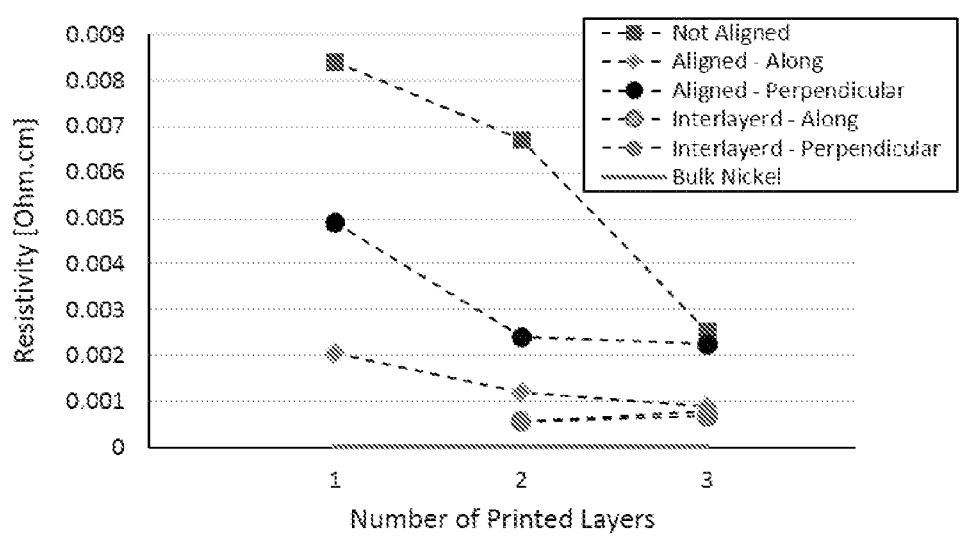
FIG. 4 is an electrical characterization of a Ni MOD ink sintered without the application of magnetic field, homogeneous magnetic field, and homogeneous magnetic field applied in perpendicular directions.

The electrical resistivity for the printed Ni MOD ink was measured using the four-point probe method. A significant difference in the electrical properties was observed for nickel reduced in the magnetic field versus that of nickel reduced in without application of external magnetic field. FIG. 4 shows the resistivity values for the different cases. As expected, the resistivity values decreased as the number of layers was increased. The reason for the decrease was that the pores generated during the sintering of the previous layer were filled with additional nickel during the printing of succeeding layers. The electrical properties of the nickel sintered in the presence of the magnetic field show lower resistivity in comparison with the nickel reduced without a magnetic field. The resistivity was lower in the direction of the aligned nickel particles in comparison with the resistivity measured perpendicular to the aligned nickel particles. For the interlayer samples produced using alternating magnetic field orientations, the resistivity was almost equal in both directions. The lowest resistivity of 0.00056 Ω·cm was observed in the interlayer samples.

Magnetic Characterization

Figure 5A:
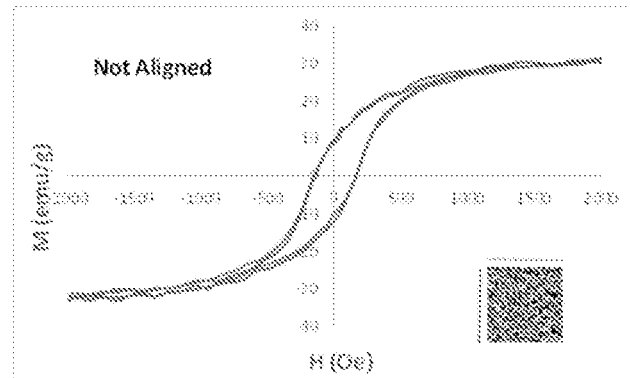
FIG. 5A is a magnetic characterization of a Ni MOD ink for particles not aligned.
Figure 5B:
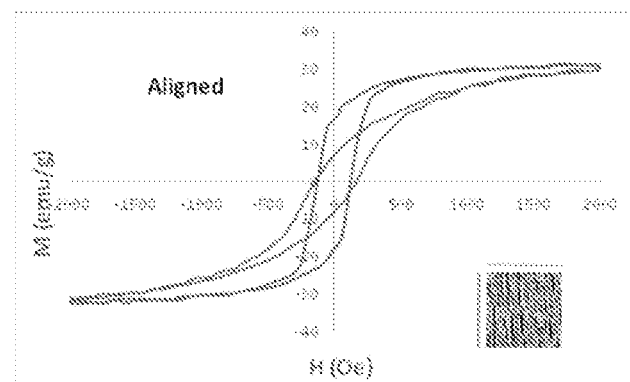
FIG. 5B shows magnetic characterization for particles aligned and FIG. 5C shows magnetic characterization for particles with interlayered orientation.
Figure 5C:
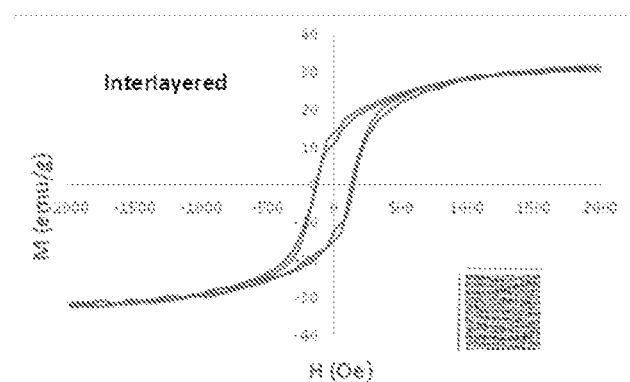

The magnetic properties of two-layer nickel films reduced in a non-magnetic field (FIG. 5A) and films reduced in the presence of a directional magnetic field (FIG. 5B) were studied by measuring the hysteresis loops. The saturation magnetization for all samples was found to be 35 emu/g, which is comparable to the bulk Ni saturation magnetization. FIG. 5A shows hysteresis loops obtained in planar perpendicular directions where soft magnetic properties were observed with remnant magnetization of 10 emu/g and coercive field of 120 Oe. By exposing the film to a directional magnetic field during the reduction process, a significant difference was obtained with induced anisotropy along the alignment direction with remnant magnetization of 20 emu/g, while the opposite direction shows a remnant magnetization of 7 emu/g. This is due to the obtained fiber-like structure that has shape anisotropy along the length direction. By aligning each layer with the directional magnetic field (FIG. 5C), higher remnant magnetization than the unaligned film was obtained in both directions due to having the interlayered fiber-like structure. The results show the possibility of tailoring the magnetic properties of the printed Ni films, which can be exploited for several applications such as magnetic data storage or magnetoresistive sensors.

Figure 6A:
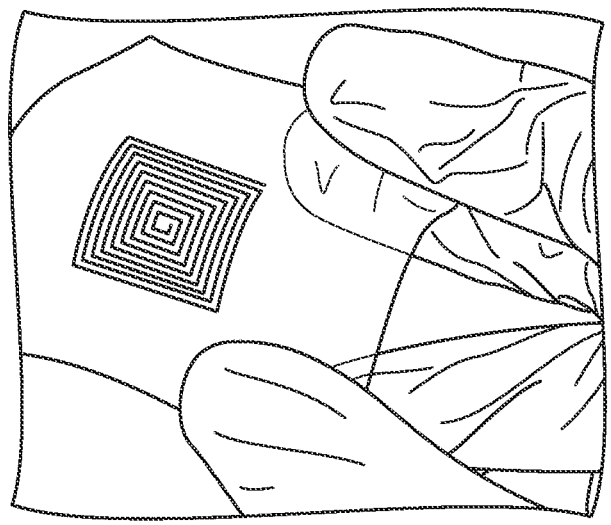
FIG. 6A is an aerosol jet printed pattern of nickel MOD ink with a square coil pattern on Kapton® thin film.
Figure 6B:
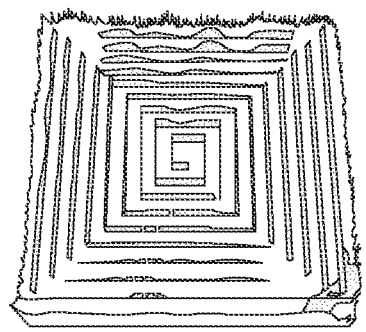
FIG. 6B is the optical profile of the sintered square coil and FIG. 6C is the cross section thickness of the sintered square coil.
Figure 6C:
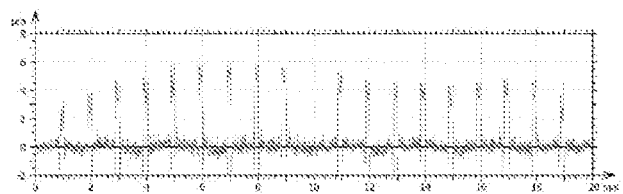

To demonstrate the feasibility of printing on a flexible substrate, three layers of nickel MOD ink with fine traces were printed on Kapton® film using the Nanojet aerosol printer (FIG. 6A). A thickness of ~5 μm was obtained after thermal processing. This Ni MOD ink shows potential for applications such as antenna and magnetic sensors where the substrate needs to be flexible.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:
1. A method of printing comprising:
  printing a ferromagnetic precursor ink on a substrate; and
  sintering the printed ink in the presence of an externally applied magnetic field, so as to reduce the printed ink into nanofibers aligned with the direction of the applied magnetic field lines.
2. The method of claim 1, wherein a plurality of layers of ferromagnetic precursor inks are printed and sintered in the presence of an externally applied magnetic field, where the orientation of the magnetic field is varied from one layer to the next such that the orientation of nanofibers varies between layers.
3. The method of claim 1, wherein a sequence of geometric patterns of ferromagnetic precursor inks are printed and sintered in the presence of an externally applied magnetic field, where the orientation of the magnetic field is varied for each printed geometric pattern such that the orientation of nanofibers is varied from one geometric pattern to another, wherein optionally the patterns fully or partially overlap with one another.
4. The method of claim 1, wherein the printing process comprises inkjet, aerosol printing, microextrusion, direct-write printing, flexography, gravure, screen printing, or ink and paste printing.
5. The method of claim 2, wherein the printing process comprises inkjet, aerosol printing, microextrusion, direct-write printing, flexography, gravure, screen printing, or ink and paste printing.
6. The method of claim 3, wherein the printing process comprises inkjet, aerosol printing, microextrusion, direct-write printing, flexography, gravure, screen printing, or ink and paste printing.
7. The method of claim 1, wherein the substrate is flexible, rigid, metallic, nonmetallic, planar, non-planar or a combination thereof.
8. The method of claim 2, wherein the substrate is flexible, rigid, metallic, nonmetallic, planar, non-planar or a combination thereof.
9. The method of claim 3, wherein the substrate is flexible, rigid, metallic, nonmetallic, planar, non-planar or a combination thereof.
10. The method of claim 1, wherein the sintering may be achieved using thermal processing tools including vacuum furnaces, hot plates, near infrared lamps, laser sintering, or pulsed photonic sintering.
11. The method of claim 2, wherein the sintering is achieved using thermal processing tools including vacuum furnaces, hot plates, near infrared lamps, laser sintering, or pulsed photonic sintering.

12. The method of claim 3, wherein the sintering is achieved using thermal processing tools including vacuum furnaces, hot plates, near infrared lamps, laser sintering, Q pulsed photonic sintering.

13. The method of claim 1, wherein the nanofibers have at least one of different aspect ratios and different orientations based on the applied magnetic field and wherein the nanofibers are densely or loosely packed.

14. The method of claim 2, wherein the nanofibers have at least one of different aspect ratios and different orientations based on the applied magnetic field and wherein the nanofibers are densely or loosely packed.

15. The method of claim 3, wherein the nanofibers have at least one of different aspect ratios and different orientations based on the applied magnetic field and wherein the nanofibers are densely or loosely packed.

16. The method of claim 1, wherein the printed ink is in the form of a film which varies in thickness.

17. The method of claim 2, wherein the printed ink is in the form of a film which varies in thickness.

18. The method of claim 3, wherein the printed ink is in the form of a film which varies in thickness.

19. The method of claim 1, wherein the ferromagnetic precursor ink further comprises metallic, nanoalloy or non-metallic nanoparticles.

20. The method of claim 2, wherein the ferromagnetic precursor ink further comprises metallic, nanoalloy or non-metallic nanoparticles.

21. The method of claim 3, wherein the ferromagnetic precursor ink further comprises metallic, nanoalloy or non-metallic nanoparticles.

22. A method of printing comprising:
printing a Ni-MOD ink on a substrate; and
sintering the printed ink in the presence of an externally applied magnetic field so as to reduce the printed ink into aligned nanofibers in the direction of the applied magnetic field lines.

23. The method of claim 22, wherein a plurality of layers of the Ni-MOD ink are printed and sintered in the presence of an externally applied magnetic field, where the orientation of the magnetic field is varied from one layer of the plurality of layers to the next such that the orientation of nanofibers varies between layers.

24. The method of claim 22, wherein a sequence of geometric patterns of the Ni-MOD ink is printed and sintered in the presence of an externally applied magnetic field, where the orientation of the magnetic field is varied for each printed geometric pattern in the sequence such that the orientation of nanofibers is varied from one geometric pattern to another, wherein optionally the patterns fully or partially overlap with one another.

* * * * *